Sept. 25, 1951  T. W. PAUL  2,568,931
BREAK-BACK MOWER DRIVE
Filed April 15, 1948  2 Sheets-Sheet 2

INVENTOR.
TALBERT W. PAUL
BY
ATTORNEYS

Patented Sept. 25, 1951

2,568,931

UNITED STATES PATENT OFFICE 2,568,931

BREAK-BACK MOWER DRIVE

Talbert W. Paul, Moline, Ill., assignor to Deere & Company, Moline, Ill., a corporation of Illinois Application April 15, 1948, Serial No. 21,268

12 Claims. (Cl. 56—25)

This invention relates to driving mechanism, and more particularly to driving mechanism of the type including a disconnectible belt between a pair of relatively movable driving and driven members. Still more particularly, the invention relates to the adaptation of such disconnectible belt drive to a tractor-mounted or tractor-connected mower.

A typical mower unit comprises a tractor which serves as a carrying frame with which is used a mower frame having a cutting mechanism including a cutter bar arranged in a normal operating position to extend laterally at one side of the tractor. The mower frame is connected to the tractor by means, ordinarily including a vertical pivot, providing for rearward displacement of the mower frame with respect to the tractor when the cutter bar is subjected to a condition in which forward travel thereof is impeded, as when the cutter bar strikes an obstruction in the field. After the impeding condition is disposed of, the mower frame may be returned forwardly to its normal operating position and the mowing operation may be continued.

The basic design of mowers of the type referred to is generally accepted; although, there are various detailed problems involved in accommodating the changes in connecting structure and driving mechanism that occur when the mower frame is displaced rearwardly with respect to the carrying frame and is returned forwardly to operating position. In the case of a tractor-mounted or tractor-connected mower, there will be a driven part on the mower frame for operating the cutting mechanism; and there will be a driving part, such as the tractor power take-off shaft, on the carrying frame, and some form of drive connection between the driving and driven parts. Provision must be made for adapting this driving mechanism to the changes that occur when the mower frame is displaced and returned with respect to the carrying frame, and it is desired that such changes that cause disconnection of the driving mechanism be accommodated by means for restoring the effectiveness of the driving mechanism when the mower frame is returned to normal position.

In many types of tractor-mounted or tractor-connected mowers, the driving mechanism includes appropriate shafting and/or gearing. In other units, the drive is accomplished by means of a pair of wheels interconnected by an endless belt. In some constructions of the latter type, the arrangement is such that the belt is allowed to remain in position trained about both wheels, but is merely loosened during rearward displacement of the mower. In some other constructions, the belt becomes disengaged from one of the wheels and must be replaced manually when the mower frame is restored to normal position.

According to the present invention, there is provided a disconnectible belt drive for the mower, and it is the principal object of the invention to provide such drive in a manner providing for separation or disconnection between the belt and one of the drive wheels when the mower frame is displaced and further providing for automatic reconnection or reengagement of the drive when the mower is returned to normal operating position. In this respect, it is an important object of the invention to provide means responsive to displacement of the mower frame for loosening the belt about one of the drive wheels so that the wheel may be separated from the belt. This means operates in conjunction with means for retaining the belt in condition to receive the drive wheel when the mower frame is returned to normal position. It is a further object of the invention to provide a disconnectible belt drive that may be adapted to implements or machines other than mowers, wherein there are a pair of relatively displaceable parts including the requirement that the drive must be disconnected and reconnected upon displacement and return of such parts.

The foregoing and other desirable objects and important features inherent in and encompassed by the invention will become apparent to those versed in the art as the disclosure is more fully made of a preferred embodiment of the invention in the following detailed description and accompanying sheets of drawings, in which.

Figure 1:
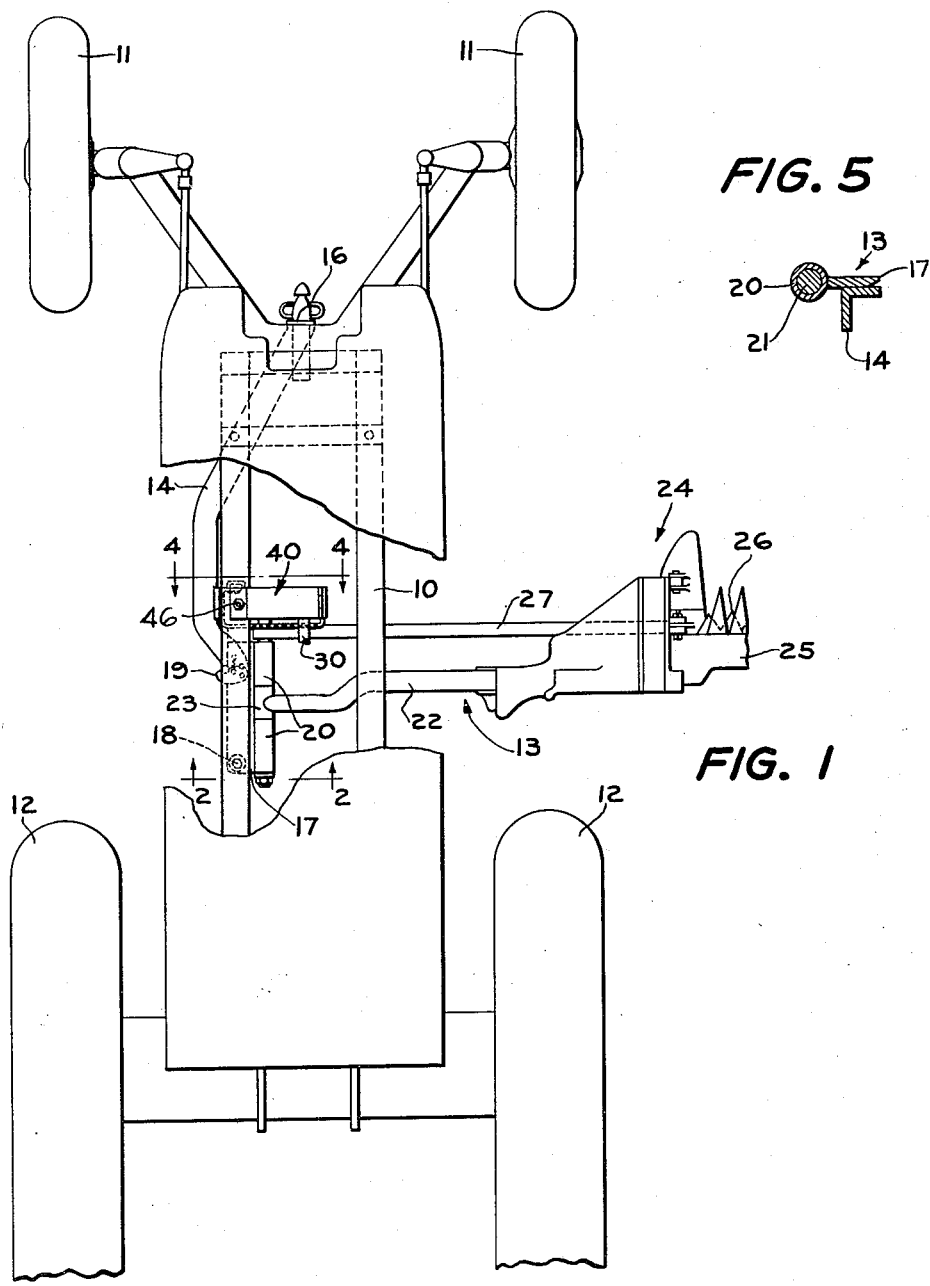
Figure 1 is a plan view of a tractor-mounted mower of a representative type, part of the tractor being broken away to show the mounting of the mower frame on the tractor frame.
Figure 2:
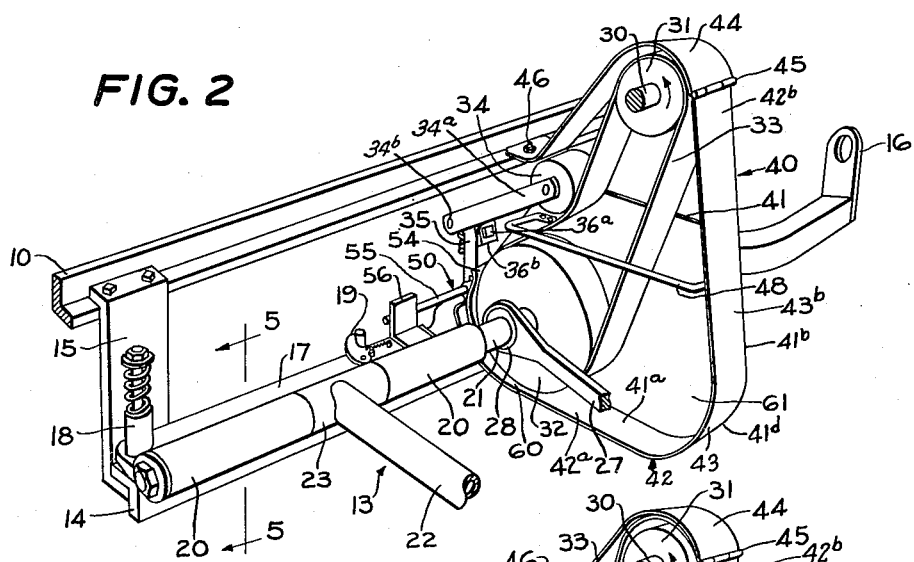
Figure 2 is an enlarged perspective view looking forwardly along the line 2—2 of Figure 1 and illustrating the relatively displaceable and returnable parts of the mower frame and carrying frame in their normal or operating positions.
Figure 3:
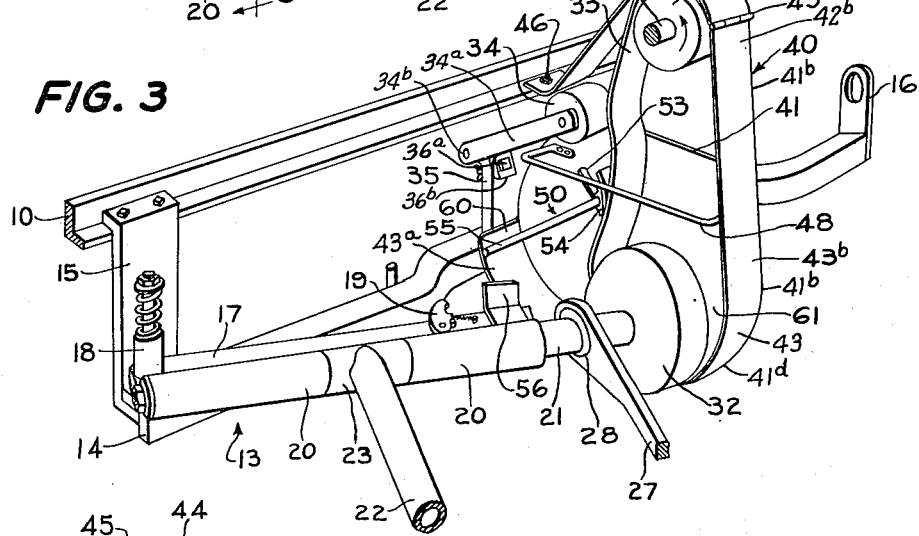
Figure 3 is a similar view showing the mower frame in a displaced condition with respect to the carrying frame.
Figure 4:
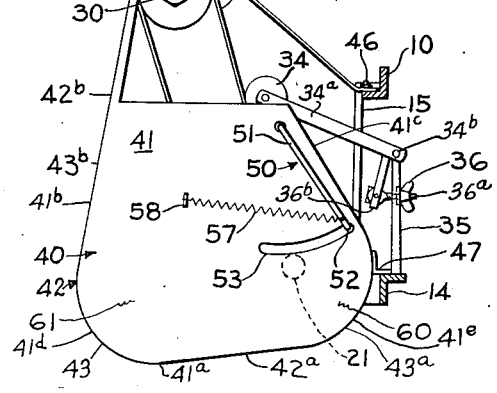

Figure 4 is a front elevational view, partly in section as viewed along the line 4—4 of Figure 1 and drawn to substantially the same scale as Figures 2 and 3; and Figure 5 is a fragmentary sectional view taken along the line 5—5 of Figure 2.

In the present disclosure, I have shown a mowing unit of the tractor-mounted type; however, it will be appreciated that the invention is just as readily applicable to mowers of other types. Accordingly, the disclosure should be taken as illustrative and not limiting.

The tractor illustrated in Figure 1 has a longitudinal body or frame 10 carried on front wheels 11 and rear wheels 12. The super-structure of the tractor is, in Figure 1, broken away intermediate the front and rear ends of the frame or body to expose the mounting thereon of a mower frame, indicated generally by the numeral 13. The mower frame, in its basic construction, may be of the type that is quickly attachable to or readily removable from the tractor. However, any type of mower may be utilized.

In the type of mower referred to, the mower frame 13 includes a generally longitudinally extending frame bar 14, the rear end of which is supported by a bracket 15 from the left hand rail of the tractor frame 10, and the forward end of which is supported by attaching means 16 associated with the forward portion of the tractor body. When the mower frame is attached to the tractor, the frame bar 14 becomes, in effect, part of the carrying structure comprising the tractor frame 10. Another part of the mower frame comprises a movable part, which may be conveniently termed a secondary mower frame including a longitudinally extending frame bar 17 normally resting on and supported by the rear portion of the longitudinal frame bar 14 and secured to the frame bar 14 by means of a vertical pivot 18 and a releasable latch 19. Since the basic concept involved in the provision of such pivot and latch means is familiar to those versed in the art, only schematic illustrations thereof have been included in the present case.

The secondary frame bar 17 includes a pair of longitudinally extending coaxial sleeves 20 which journal a longitudinally extending shaft 21. A coupling or drag bar 22 extends laterally grasswardly from the secondary frame member 17 and has its inner end provided as a tee 23 through which is passed the longitudinal shaft 21, thereby mounting the drag bar 22 on the secondary frame 17. The mounting is such as to provide for vertical movement of the drag bar 22 about the longitudinal horizontal axis of the shaft 21.

Another part of the secondary mower frame includes cutting mechanism, designated generally by the numeral 24 (Figure 1), which may include, in the conventional manner, a cutter bar 25 and a reciprocating sickle or knife 26. The sickle or knife 26 is reciprocated by a laterally extending pitman 27, the inner end of which is connected by an eccentric 28 to the longitudinally extending rotatable shaft 21 previously described.

In its normal operating position, the cutting mechanism 24 is positioned as shown in Figure 1; that is, with the cutter bar 25 extending grasswardly from the carrying or tractor frame 10. In this relationship of the frames, the mower frame is pivotally supported at 18 and releasably supported at 19. When the cutter bar strikes an obstruction of sufficient magnitude to impede its forward travel with respect to the tractor, the latch 19 releases and the mower frame 13 may be displaced rearwardly with respect to the tractor about the vertical pivot axis through the pivot means 18. When the obstruction is passed or disposed of, the cutting mechanism or mower frame may be swung forwardly about the pivot 18 until the latch 19 is reengaged, whereupon the mower is again ready for operation. The foregoing operation is referred to only briefly, since the general picture thereof is familiar to those versed in the art.

The particular type of tractor chosen for the purposes of the present illustration may be of the type disclosed in assignee's patent to Brown, 2,378,615. Such tractor includes a power plant in the form of an internal combustion engine (not shown here) which, in addition to driving the tractor, also delivers power to a longitudinally extending power shaft, designated herein by the numeral 30. The direction of rotation of this shaft is indicated by arrows in Figures 2, 3 and 4. This shaft has secured thereto for rotation therewith a first wheel or pulley which may be conveniently termed a driving pulley 31. The forward end of the longitudinally extending shaft 21 of the mower frame has keyed thereto a second wheel or pulley which may be termed a driven wheel 32. When the mower frame is in its normal or operating position, as shown in Figure 1, the wheels 31 and 32 are disposed so that the former is above the lower and the two rotate generally in the same transverse plane. The axis of rotation of the wheel 31 is offset grasswardly with respect to the vertical pivot 18; also, the wheel 31 is a considerable distance ahead of the pivot 18. The rotating axis of the wheel 32, it will be noted, is relatively close to the pivot 18. Therefore, the distance between the centers of the wheels 31 and 32 is greater than the distance along a line perpendicular to the horizontal plane of the axis of the wheel 32 and intersecting the axis of the wheel 31.

An endless belt 33 is trained about the wheels or pulleys 31 and 32 and the length of the belt is such as to require tightening during normal operation thereof to establish drive between the wheels. For this purpose, I have indicated at 34 a belt tightener in the form of an idler wheel rotatably carried at one end of an arm 34a which is pivoted at 34b to the upper end of a support 35 on the mower frame part 14. The numeral 36 (Figure 4) indicates a representative adjusting means for adjusting the idler wheel 34 with respect to the belt 33, as by means of an adjusting bolt 36a connected between the support 35 and a lug 36b fixed to and depending from the arm 34a.

It will be seen from the description thus far that when the mower frame 13 is displaced rearwardly with respect to the carrying frame 10, as when the cutter bar strikes an obstruction in the field, the driven wheel 32 will travel grasswardly and rearwardly in an arc about the pivot point 18. This action will, of course, affect the driving relationship between the wheels as established by the belt 33. In the ordinary case, it may suffice to allow the parts to move in such manner that the belt 33 would become separated from one or the other of the wheels, following which it would be necessary to replace the belt 33 manually when the cutting mechanism is returned to normal operating position. According to the present invention, however, a much more desirable result is accomplished. As will be set out below, the drive between the wheels 31 and 32 is automatically disconnected and reconnected, respectively, when the mower frame is displaced rearwardly and returned forwardly.

The means for accomplishing the automatic disconnection and reconnection of the drive between the wheels 31 and 32 comprises a shield structure designated generally by the numeral 40. This shield includes a main forward wall portion 41 of substantially triangular shape as shown, including a base or bottom edge 41$^a$ and upwardly converging slide edges 41$^b$ and 41$^c$ joined to the bottom edge 41$^a$ by rounded corners 41$^d$ and 41$^e$. The shield further has a peripheral wall 42 including a bottom 42$^a$ joined to and extending perpendicularly from the bottom edge 41$^a$ and joined to and coextensive with the rounded corners 41$^d$ and 41$^e$ and the side edge 41$^b$, as at 43, 43$^a$ and 43$^b$. The wall along the side edge 41$^b$ extends upwardly at 42$^b$ and has a hinged top wall portion 44 connected by a hinge 45 so that it may be disconnected at 46 from the tractor frame 10, to expedite removal of the mower frame from the tractor. Basically, however, the shield structure may be of any design that accomplishes the function to be brought out hereinafter. The shield may be carried on the mower unit in any convenient manner, as at 46, already described, and further by means of a support as designated at 47 (Figure 4).

The wall portions 41, 42$^a$ and 43$^b$ are so arranged as to provide ample operating clearance for the belt 33 and are further provided in such manner as to guide or support the belt during the various positions the belt will assume while the driven wheel 32 moves away from and returns to the belt. The shield structure 40 includes an additional support or guide means in the form of a rod 48 which is disposed behind the belt 33 in parallel relation to the forward wall 41.

The shield further includes a follower means designated generally by the numeral 50 and including a swinging arm 51 pivoted to an upper forward portion of the shield structure 40 (Figure 4). The swinging arm 51 includes a lower rearwardly extending portion 52 which is operative in an arcuate slot 53 formed in the front wall 41 of the shield. This rearwardly extending portion of the arm carries, rearwardly of the wall 41, a shoe 54 which is normally positioned to engage the belt at the left hand side of the driven wheel 32. The rod 53 is continued rearwardly beyond the shoe 54, as at 55, and is normally engaged by an abutment 56 rigid on the secondary mower frame bar 17. A tension spring 57 is disposed ahead of the forward wall 41 of the shield structure 40 and operates between a lower portion of the swinging arm 51 and an anchor point 58 to urge the shoe 54 laterally in a grassward direction, a result that is resisted by engagement between the rod portion 55 and abutment 56 as long as the mower frame is in normal operating position.

The construction of the shield and its related walls is such that the shoe has a generally triangular shape with curved or pocketed apices or corners one of which is provided by the upper wall portion 44 which relatively closely encloses the driving wheel 31 and the portion of the belt trained thereabout. The lower portion of the shield provides a left hand or stubbleward pocket, designated generally by the numeral 60 and a right hand or grassward pocket indicated by the numeral 61. When the parts are in their normal operating positions, as shown in Figure 2, the driven wheel 32 is directly ahead of the pivot 18 and the wheel and the belt trained thereabout are accommodated in the stubbleward pocket 60.

The operation of the structure is as follows:

The mowing unit is in operating condition when the parts are as shown in Figures 1, 2, 4 and 5. The cutter bar extends grasswardly from the carrying frame in operating position. The driven wheel 32 is in the left hand pocket 60 of the shield structure 40 (Figure 2). The secondary mower frame bar or support 17 is carried on the mower frame bar or support 14 and the releasable latch 19 is engaged to accomplish this support. When the cutter bar encounters a condition such as to impede its forward travel along with the carrying frame, the spring pressure on the latch 19 is overcome and the mower frame is displaced rearwardly about the pivot 18. At such time, the shaft 21 is, in effect, a radius from the point 18 and swings about that point, carrying with it the driven wheel 32 in an arcuate path grasswardly and rearwardly. Since the belt 33 remains trained about the wheels 31 and 32, and particularly about the wheel 32, the lower portion of the belt is likewise moved grasswardly. At the same time, the left hand or stubbleward run of the belt 33 moves away from the idler 34, and the belt thus becomes loosened and is allowed to loop loosely about the wheels 31 and 32. As the wheel 32 travels in its arcuate path from left to right, it first approaches and then departs from a position substantially directly below the driving wheel 31. In other words, as the wheel 32 leaves its position of Figure 2 and approaches the position shown in Figure 3, the distance between the rotating axes of the wheels 31 and 32 is shortened; thus further contributing to the condition of looseness of the driving belt 33.

As the wheel 32 approaches the pocket 61 at the grassward side of the shield structure 40, it is moving in the aforesaid arc, whereas the belt 33 moves laterally generally in a straight path, since it is confined between the forward wall 41 and the transverse guiding rod 48. As the wheel 32 and lower portion of the belt 33 reach the pocket 61, the wheel 32 will depart from the loosened belt and the wheel may continue rearwardly and grasswardly along with the displaced mower frame.

Initial movement of the wheel 32 and lower portion of the belt 33 grasswardly is accompanied by a following action by the follower means 50, since the abutment 56 moves in the same direction as the force applied by the tension spring 57. Therefore, the shoe 54 follows the left hand portion of the belt 33. In the presently illustrated case, the belt 33 is, or may be, a flexible leather belt, the natural tendency of which when loosened is to assume a circular form. In this respect, however, it should be noted that since the disconnectible wheel (32) is below the other wheel (31), the lower portion of the belt would have a tendency to sag; but the lower wall 42$^a$ of the shield structure provides means for supporting the lower portion of the belt and the shoe 54, when reaching the position shown in Figure 3, tends to keep the belt from expanding to the left, thereby cooperating with the portion 42$^a$ and pocket 61 to keep the lower portion of the belt in a looped form from which the wheel 32 may easily become separated and back into which the wheel 32 may easily move when the mower is restored to operating position.

It is a feature of the invention that the disconnection between the driving wheel 31 and driven wheel 32 is accomplished without discontinuing the application of power to the wheel 31. Therefore, the wheel 31 is allowed to continue its rotation and the upper portion of the shield structure 40, including the curved upper wall 44, accommodates the upper portion of the belt as it is thrown off the wheel 31. Although the belt 33, in the position of Figure 3, is relatively loose, it is appropriately confined against undesirable displacement. The wall portion 41 and the transverse guide rod 48 prevent fore and aft displacement of the belt. The upper portion 44 of the shield prevents upward displacement of the belt; and the cooperation between the parts 54, 42 and 61 prevents displacement of the belt in other directions or, in other words, holds the lower portion of the belt in a loosely looped condition to receive the wheel 32 as it returns forwardly and to the left as the mower frame is returned to operating position.

When the mower frame returns to operating position, the abutment 56 reengages the rod portion 55 and moves the shoe 54 to the left against the tension of the spring; hence, when the mower frame is latched by the latch 19, the engagement between the abutment 56 and rod 54 is such as to keep the shoe 54 out of engagement with the left hand run of the belt, thereby eliminating frictional contact between the shoe and belt. Restoration of the mower to its normal operating position further reengages the belt with the idler 34 and the belt is again in position to establish driving relationship between the driving wheel 31 and driven wheel 32, whereupon the mowing operation may be resumed without the exertion of any manual effort in connection with the driving mechanism.

The foregoing disclosure of a preferred embodiment of the invention in connection with driving mechanism for a mower will readily suggest the application of the invention to other instances. In addition to other uses of the invention, numerous modifications and alterations may be made in the detailed structure illustrated without departing from the spirit and scope of the invention as defined in the appended claims.

I claim:

1. In an implement unit having a carrying part and an implement part and means connecting the two for displacement and return movement of the implement part from and to a normal position with respect to the carrying part, the improvement comprising: first and second drive wheels journaled respectively on the parts, the second wheel being on the implement part and thereby displaceable and returnable with respect to the first wheel; an endless belt trained about the wheels and having such length as to require tightening; a belt-tightener carried by one of the parts and normally engaging one run of the belt to tighten the belt; means arranging said tightener and said run of the belt for relative movement toward or away from each other to establish the aforesaid condition of tightness, when the implement part is in its normal position, or a condition of looseness in which the belt will loop loosely about at least the second wheel, when the implement part is displaced; means adjacent the first wheel for limiting excessive looping of the belt about said first wheel; means operative in response to displacement of the implement part for influencing the loosened belt toward a condition of looping loosely about the second wheel to permit the second wheel to move out of the belt; and means operative while the implement part is displaced to retain the belt in said condition so that the second wheel may move back into the belt when the implement part is returned.

2. In an implement unit having a carrying part and an implement part and means connecting the two for displacement and return movement of the implement part from and to a normal position with respect to the carrying part, the improvement comprising: first and second drive wheels journaled respectively on the parts, the second wheel being on the implement part and thereby displaceable and returnable with respect to the first wheel; an endless belt trained about the wheels and having such length as to require tightening; means operative to keep the belt tight while the wheels are normally positioned and operative in response to displacement of the implement part to effect loosening of the belt; means for retaining the belt against displacement along with the second wheel so that the latter may move out of the belt; and means effective while the implement part is displaced to hold the belt open and thus in condition to receive the second wheel when it returns with the implement part.

3. In a mower: a carrying frame having front and rear ends; a mower frame, including cutting mechanism, normally arranged in operating position so that the cutting mechanism extends grasswardly at one side of the carrying frame; means including a vertical pivot interconnecting the two frames for rearward swinging of the mower frame from normal position, when the cutting mechanism is subjected to a condition impeding its forward travel, and for return swinging forwardly when such condition is disposed of; a driven wheel journaled on a fore and aft extending axis on the mower frame ahead of the pivot means and thereby swingable, with the mower frame and with respect to the carrying frame, in an arcuate path grasswardly and rearwardly as the mower frame swings rearwardly and in an arcuate return path as the mower frame returns to operating position; a driving wheel rotatable on the carrying frame on a fore and aft axis offset both vertically and grasswardly from the driven wheel axis, said wheels normally lying generally in the same plane of rotation and the driven wheel, when swinging from its normal position, first approaches and then departs grasswardly and rearwardly from a condition of substantially vertical alignment with the driving wheel, and, conversely, when returning to normal position, first approaches and then departs from such condition; a belt trained about and normally effective to establish drive between the wheels but relaxable, when carried by the driven wheel as the driven wheel moves grasswardly and approaches the aforesaid condition of substantially vertical alignment with the driving wheel, to loop loosely about the wheels; means on one of the frames for confining major looping of the belt to the driven wheel; and means on one of the frames for retaining the belt in said loosely looped condition and against fore and aft displacement so that the driven wheel may move rearwardly and grasswardly out of the belt and may return forwardly and laterally into the belt to pick up the belt for return of both the belt and driven wheel to normal position.

4. In a mower: a carrying frame having front and rear ends; a mower frame, including cutting mechanism, normally arranged in operating position so that the cutting mechanism extends grasswardly at one side of the carrying frame; means including a vertical pivot interconnecting the two frames for rearward swinging of the mower frame from normal position, when the cutting mechanism is subjected to a condition impeding its forward travel, and for return swinging forwardly when such condition is disposed of; a driven wheel journaled on a fore and aft extending axis on the mower frame ahead of the pivot means and thereby swingable, with the mower frame and with respect to the carrying frame, in an arcuate path grasswardly and rearwardly as the mower frame swings rearwardly and in an arcuate return path as the mower frame returns to operating position; a driving wheel rotatable on the carrying frame on a fore and aft axis offset both vertically and grasswardly from the driven wheel axis, said wheels normally lying generally in the same plane of rotation and the driven wheel, when swinging from its normal position, first approaches and then departs grasswardly and rearwardly from a condition of substantially vertical alignment with the driving wheel, and, conversely, when returning to normal position, first approaches and then departs from such condition; a belt trained about and normally effective to establish drive between the wheels but relaxable, when carried by the driven wheel as the driven wheel moves grasswardly and approaches the aforesaid condition of substantially vertical alignment with the driving wheel, to loop loosely about the wheels; means on one of the frames for limiting grassward displacement of the grassward run of the belt by the driven wheel to a condition of substantially vertical alignment with the driving wheel; means on one of the frames and operative upon rearward swinging of the mower frame to confine the opposite run of the belt to a condition in which it is spaced laterally from the grassward run a distance slightly greater than the diameter of the driven wheel; and means on one of the frames for confining the belt against vertical displacement so that the driven wheel may move rearwardly and grasswardly out of the belt and may return forwardly and laterally into the belt to pick up the belt for return of both the belt and driven wheel to normal position.

5. In a mower: a carrying frame having front and rear ends; a mower frame, including cutting mechanism, normally arranged in operating position so that the cutting mechanism extends grasswardly at one side of the carrying frame; means including a vertical pivot interconnecting the two frames for rearward swinging of the mower frame from normal position, when the cutting mechanism is subjected to a condition impeding its forward travel, and for return swinging forwardly when such condition is disposed of; a driven wheel journaled on a fore and aft extending axis on the mower frame ahead of the pivot means and thereby swingable, with the mower frame and with respect to the carrying frame, in an arcuate path grasswardly and rearwardly as the mower frame swings rearwardly and in an arcuate return path as the mower frame returns to operating position; a driving wheel rotatable on the carrying frame on a fore and aft axis offset both vertically and grasswardly from the driven wheel axis, said wheels normally lying generally in the same plane of rotation and the driven wheel, when swinging from its normal position, first approaches and then departs grasswardly and rearwardly from a condition of substantially vertical alignment with the driving wheel, and, conversely, when returning to normal position, first approaches and then departs from such condition; a belt trained about and normally effective to establish drive between the wheels but relaxable, when carried by the driven wheel as the driven wheel moves grasswardly and approaches the aforesaid condition of substantially vertical alignment with the driving wheel, to loop loosely about the wheels; mean on one of the frames and operative upon rearward swinging of the mower frame to enlarge the loop at that portion of the belt passing about the driven wheel; and means on one of the frames operative while the mower frame is out of normal position to retain the belt in the aforesaid looped condition so that the driven wheel may move rearwardly and grasswardly out of the belt and may return forwardly and laterally into the belt to pick up the belt for return of both the belt and driven wheel to normal position.

6. In a mower: a carrying frame having front and rear ends; a mower frame, including cutting mechanism, normally arranged in operating position so that the cutting mechanism extends grasswardly at one side of the carrying frame; means including a vertical pivot interconnecting the two frames for rearward swinging of the mower frame from normal position, when the cutting mechanism is subjected to a condition impeding its forward travel, and for return swinging forwardly when such condition is disposed of; a driven wheel journaled on a fore and aft extending axis on the mower frame ahead of the pivot means and thereby swingable, with the mower frame and with respect to the carrying frame, in an arcuate path grasswardly and rearwardly as the mower frame swings rearwardly and in an arcuate return path as the mower frame returns to operating position; a driving wheel rotattable on the carrying frame on a fore and aft axis offset both above and grasswardly from the driven wheel axis, said wheels normally lying generally in the same plane of rotation and the driven wheel, when swinging from its normal position, first approaches and then departs grasswardly and rearwardly from a condition directly below the driving wheel, and, conversely, when returning to normal position, first approaches and then departs from such condition; a belt trained about and normally effective to establish drive between the wheels but relaxable, when carried by the driven wheel as the driven wheel moves grasswardly and below the driving wheel, to loop loosely about the wheels; and means on one of the frames effective upon rearward swinging of the mower frame to support the belt against sagging below the driven wheel, as said belt becomes relaxed, and thus to retain the lower portion of the belt in loosely looped form so that the driven wheel may move rearwardly and grasswardly out of the belt and may return forwardly and laterally into the belt to pick up the belt for return of both the belt and driven wheel to normal position.

7. In a mower: a carrying frame having front and rear ends; a mower frame, including cutting mechanism, normally arranged in operating position so that the cutting mechanism extends grasswardly at one side of the carrying frame; means including a vertical pivot interconnecting the two frames for rearward swinging of the mower frame from normal position, when the cutting mechanism is subjected to a condition impeding its forward travel, and for return swinging forwardly when such condition is disposed of; a driven wheel journaled on a fore and aft extending axis on the mower frame ahead of the pivot means and thereby swingable, with the mower frame and with respect to the carrying frame, in an arcuate path grasswardly and rearwardly as the mower frame swings rearwardly and in an arcuate return path as the mower frame returns to operating position; a driving wheel rotatable on the carrying frame on a fore and aft axis offset both above and grasswardly from the driven wheel axis, said wheels normally lying generally in the same plane of rotation and the driven wheel, when swinging from its normal position, first approaches and then departs grasswardly and rearwardly from a condition directly below the driving wheel, and, conversely, when returning to normal position, first approaches and then departs from such condition; a belt trained about and normally effective to establish drive between the wheels but relaxable, when carried by the driven wheel as the driven wheel moves grasswardly and below the driving wheel, to loop loosely about the wheels; and means on one of the frames effective upon rearward swinging of the mower frame to hold the lower portion of the belt in a generally U-shaped condition wide enough to provide for swinging of the driven wheel into and out of the belt.

8. In an implement unit having a carrying part and an implement part and means connecting the two for displacement and return movement of the implement part from and to a normal position with respect to the carrying part, the improvement comprising: first and second drive wheels journaled respectively on the parts, the second wheel being on the implement part and thereby displaceable and returnable with respect to the first wheel; an endless belt trained about the wheels and having such length as to require tightening; means on one of the parts operative while the implement part is in normal position to tension the belt so that drive is established between the wheels and operative upon displacement of the implement part to effect relaxation of the belt so that the belt will loop loosely about at least the second wheel to permit the second wheel to move out of the belt; and means on one of the parts operative while the implement part is displaced for retaining in loosely looped condition at least that portion of the belt from which the second wheel has moved so that said second wheel may move back into the belt when the implement part is returned.

9. In an implement unit having a carrying part and an implement part and means connecting the two for displacement and return movement of the implement part from and to a normal position with respect to the carrying part, the improvement comprising: first and second drive wheels journaled respectively on the parts, the second wheel being on the implement part and thereby displaceable and returnable with respect to the first wheel; an endless belt trained about the wheels and having such length as to require tightening; means on one of the parts operative while the implement part is in normal position to tension the belt so that drive is established between the wheels and operative upon displacement of the implement part to cause the belt to loosen so that it loops loosely at least about the second wheel and permits said second wheel to move out of the belt; and means on one of the frames for conditioning the belt to receive the second wheel as the latter returns with the implement part.

10. In a mower: a carrying frame having front and rear ends; a mower frame, including cutting mechanism, normally arranged in operating position so that the cutting mechanism extends grasswardly at one side of the carrying frame; means including a vertical pivot interconnecting the two frames for rearward swinging of the mower frame from normal position, when the cutting mechanism is subjected to a condition impeding its forward travel, and for return swinging forwardly when such condition is disposed of; a driven wheel journaled on a fore and aft extending axis on the mower frame ahead of the pivot means and thereby swingable, with the mower frame and with respect to the carrying frame, in an arcuate path grasswardly and rearwardly as the mower frame swings rearwardly and in an arcuate return path as the mower frame returns to operating position; a driving wheel rotatable on the carrying frame on a fore and aft axis offset both vertically and grasswardly from the driven wheel axis, said wheels normally lying generally in the same plane of rotation and the driven wheel, when swinging from its normal position, first approaches and then departs grasswardly and rearwardly from a condition of substantially vertical alignment with the driving wheel, and, conversely, when returning to normal position, first approaches and then departs from such condition; a belt trained about and normally effective to establish drive between the wheels but relaxable, when carried by the driven wheel as the driven wheel moves grasswardly and approaches the aforesaid condition of substantially vertical alignment with the driving wheel, to loop loosely about the wheels; means movable grasswardly on one of the frames, and operative upon grassward swinging of the driven wheel, to engage and follow the belt and to support the belt against buckling laterally as the driven wheel moves out of the belt; and means on one of the frames and cooperative with the follower means for supporting the belt in a loosely looped condition to receive the driven wheel upon return thereof to normal.

11. In a mower: a carrying frame having front and rear ends; a mower frame, including cutting mechanism, normally arranged in operating position so that the cutting mechanism extends grasswardly at one side of the carrying frame; means including a vertical pivot interconnecting the two frames for rearward swinging of the mower frame from normal position, when the cutting mechanism is subjected to a condition impeding its forward travel, and for return swinging forwardly when such condition is disposed of; a driven wheel journaled on a fore and aft extending axis on the mower frame ahead of the pivot means and thereby swingable, with the mower frame and with respect to the carrying frame, in an arcuate path grasswardly and rearwardly as the mower frame swings rearwardly and in an arcuate return path as the mower frame returns to operating position; a driving wheel rotatable on the carrying frame on a fore and aft axis offset both vertically and grasswardly from the driven wheel axis, said wheels normally lying generally in the same plane of rotation and the driven wheel, when swinging from its normal position, first approaches and then departs grasswardly and rearwardly from a condition of substantially vertical alignment with the driving wheel, and, conversely, when returning to normal position, first approaches and then departs from such condition; a belt trained about and normally effective to establish drive between the wheels but relaxable, when carried by the driven wheel as the driven wheel moves grasswardly and approaches the aforesaid condition of substantially vertical alignment with the driving wheel, to loop loosely about the wheels; spring-loaded means movable grasswardly on one of the frames, and operative upon grassward swinging of the driven wheel, to engage and follow the belt and to support the belt against buckling laterally as the driven wheel moves out of the belt; means on one of the frames and cooperative with the follower means for supporting the belt in a loosely looped condition to receive the driven wheel upon return thereof to normal; and means connected to the mower frame and engaging the follower means for disabling the spring loaded condition thereof when the mower frame is in normal position.

12. In an implement unit having a carrying part and an implement part and means connecting the two for displacement and return movement of the implement part from and to a normal position with respect to the carrying part, the improvement comprising: first and second drive wheels journaled respectively on the parts, the second wheel being on the implement part and thereby displaceable and returnable with respect to the first wheel; an endless belt trained about the wheels and having such length as to require tightening; means on one of the parts operative during normal positioning of the wheels to keep the belt tight; means, operative upon initial movement of the implement part toward displacement, for loosening the belt; means on one of the parts and effective upon displacement of the implement part to cause relative displacement between the belt and one of the wheels so that the two may separate; and means on one of the parts for supporting the belt in condition to receive therewithin, upon return of the implement part, the wheel from which it had become separated.

TALBERT W. PAUL.

REFERENCES CITED

The following references are of record in the file of this patent:

UNITED STATES PATENTS

| Number | Name | Date |
|---|---|---|
| 1,903,120 | Lafferty | Mar. 28, 1933 |
| 1,947,552 | Huddle | Feb. 20, 1934 |
| 2,097,351 | Smith | Oct. 26, 1937 |
| 2,202,878 | Tautz | June 4, 1940 |
| 2,375,912 | Gifford et al. | May 15, 1945 |